US011539632B2

(12) United States Patent
Jones et al.

(10) Patent No.: US 11,539,632 B2
(45) Date of Patent: Dec. 27, 2022

(54) SYSTEM AND METHOD FOR DETECTING CONSTANT-DATAGRAM-RATE NETWORK TRAFFIC INDICATIVE OF AN UNMANNED AERIAL VEHICLE

(71) Applicant: Research Electronics International, LLC, Cookeville, TN (US)

(72) Inventors: Thomas H. Jones, Cookeville, TN (US); Ross Alan Binkley, Cookeville, TN (US)

(73) Assignee: Research Electronics International, LLC, Cookeville, TN (US)

( * ) Notice: Subject to any disclaimer, the term of this patent is extended or adjusted under 35 U.S.C. 154(b) by 118 days.

(21) Appl. No.: 17/187,879

(22) Filed: Feb. 28, 2021

(65) Prior Publication Data

US 2022/0078124 A1 Mar. 10, 2022

Related U.S. Application Data

(63) Continuation-in-part of application No. 16/290,905, filed on Mar. 2, 2019, now Pat. No. 10,938,682,
(Continued)

(51) Int. Cl.
*H04L 47/2441* (2022.01)
*G08G 5/00* (2006.01)
*H04W 84/12* (2009.01)

(52) U.S. Cl.
CPC ......... *H04L 47/2441* (2013.01); *G08G 5/006* (2013.01); *G08G 5/0069* (2013.01); *H04W 84/12* (2013.01)

(58) Field of Classification Search
CPC ............ H04L 47/2441; H04L 63/1425; H04L 63/1466; H04L 43/0894; G08G 5/006;
(Continued)

(56) References Cited

U.S. PATENT DOCUMENTS

2011/0090792 A1* 4/2011 Ronneke ............ H04L 47/2416
370/232
2011/0090939 A1* 4/2011 Diener .................. H04L 1/0001
375/136

(Continued)

*Primary Examiner* — Kyaw Z Soe
(74) *Attorney, Agent, or Firm* — Hornkohl Intellectual Property Law, PLLC; Jason C. Hornkohl

(57) ABSTRACT

A system and method for detecting unmanned aerial vehicles (UAV) includes capturing a set of wireless data traffic from a wireless transmission and performing frequency spectrum analysis on datagram arrival times to classify the wireless data traffic based upon potential constant-datagram-rate data content that may be indicative that at least a portion of the wireless data traffic is emanating from a UAV. The wireless data traffic may be captured from one or more Wi-Fi receivers and sorted based upon transmission parameters prior to performing the frequency spectrum analysis. Detected peak frequencies may be used to determine if any constant-datagram-rate traffic within the wireless data traffic potentially contains data traffic streaming from a UAV. Directional antennas and/or a phased array of antennas can be used to determine the direction of propagation of the wireless transmission and further classify the wireless data traffic based on potential emanation from a UAV.

20 Claims, 11 Drawing Sheets

Related U.S. Application Data which is a continuation-in-part of application No. 14/984,188, filed on Dec. 30, 2015, now Pat. No. 10,230,821.

(60) Provisional application No. 62/097,924, filed on Dec. 30, 2014.

(58) Field of Classification Search
CPC .. G08G 5/0069; G08G 5/0026; G08G 5/0052; G08G 5/0082; H04W 84/12; H04W 12/121; H04W 24/08
See application file for complete search history.

(56) References Cited

U.S. PATENT DOCUMENTS

| | | | |
|---|---|---|---|
| 2013/0121177 A1* | 5/2013 | Morton | H04L 43/16 370/252 |
| 2014/0310394 A1* | 10/2014 | Wood | H04L 41/142 709/224 |
| 2016/0191390 A1* | 6/2016 | Barsumian | H04L 67/75 370/208 |
| 2017/0155460 A1* | 6/2017 | Phillips | H04L 27/06 |

\* cited by examiner

SYSTEM AND METHOD FOR DETECTING CONSTANT-DATAGRAM-RATE NETWORK TRAFFIC INDICATIVE OF AN UNMANNED AERIAL VEHICLE

CROSS-REFERENCES TO RELATED APPLICATIONS

The present application is a continuation-in-part of, and claims priority from, Utility patent application Ser. No. 16/290,905, entitled "System and Method for Detecting Constant-Datagram-Rate Network Traffic" filed Mar. 2, 2019 which claimed priority from Utility patent application Ser. No. 14/984,188 entitled "System and Method for Detecting VOIP Traffic" filed Dec. 30, 2015 which claimed priority from Provisional Patent Application No. 62/097,924 entitled "System and Method for Detecting VOIP Traffic" filed Dec. 30, 2014, all of which are hereby incorporated by reference.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

Covert surveillance methods such as UAV (Un-manned Arial Vehicle) based surveillance, wiretapping and malicious modification of telephone systems pose a serious threat to the security of sensitive information in many industries. Since smart phones have become ubiquitous and contain all of the components needed to capture audio and/or video and transmit it to a remote location where it can be monitored, they have become a common target for eavesdropping attacks. While much focus has been given to interception of sensitive telephone calls, another common method of attack is to modify telephone systems to listen to and transmit the audio from a room, even when a call is not in progress.

Further, with the proliferation of relatively low-cost unmanned aerial vehicles (UAVs) commonly known as drones, concerns about their potential risks to security and privacy have been raised. Whether concerned about the possibility of their use as a weapon or for unauthorized surveillance, a need has arisen to be able to detect the presence of unauthorized UAVs. With the vast majority of consumer UAVs using packetized wireless data networks such as Wi-Fi for command-and-control and sending audio, video, and telemetry updates to their controllers, the present inventors propose a system and method for detecting the presence of UAVs based on detection of their characteristic constant-datagram-rate wireless network traffic.

Various methods have been proposed in the literature for detecting UAVs, including active radar-style approaches as well as passive approaches such as detecting the periodic radio transmissions from their transmitters, typically between 20 Hz and 100 Hz, or detecting patterns in a received wireless transmission that indicate the transmitter is being affected by the body vibrations characteristic of a drone.

BRIEF SUMMARY OF THE INVENTION

Some embodiments of the present invention are directed toward a method of detecting unmanned aerial vehicles. The method includes capturing a set of data traffic from a wireless transmission and performing frequency spectrum analysis on datagram arrival times to classify the set of wireless data traffic based upon potential constant-datagram-rate data content that is indicative that at least a portion of the set of wireless data traffic is emanating from an unmanned aerial vehicle.

In some embodiments, the method further comprises capturing the set of wireless network data traffic from a Wi-Fi receiver. In some embodiments, the Wi-Fi receiver is periodically switched between different radio-frequency channels. In some embodiments, multiple Wi-Fi receivers are used to capture the network data traffic with each receiver tuned to a different radio-frequency channel. In some embodiments, the method further comprises sorting the set of wireless data traffic based upon a media access control-layer parameter prior to performing the frequency spectrum analysis. In some embodiments, the method further comprises using a threshold function to detect peaks in output data of the frequency spectrum analysis. In some embodiments, the method further comprises using detected peak frequencies to determine if any constant-datagram-rate traffic within the set of wireless data traffic potentially contains video traffic streaming from an unmanned aerial vehicle. In some embodiments, the method further comprises using detected peak frequencies to determine if any constant-datagram-rate traffic within the set of wireless data traffic potentially contains streaming command, control, and position update messages sent to or from an unmanned aerial vehicle. In some embodiments, the method further comprises filtering the set of wireless data traffic prior to performing the frequency spectrum analysis by one or more of datagram size, radio-frequency channel, source IP address, destination IP address, source port number, destination port number, and transport-layer protocol. In some embodiments, the method further comprises using the direction of propagation of the wireless transmission to classify the set of wireless data traffic based on potential emanation from an unmanned aerial vehicle. In some embodiments, the method further comprises using at least one of a directional antenna and a phased array of antennas to determine the direction of propagation of the wireless transmission.

Other embodiments of the present invention are directed toward a system for detecting unmanned aerial vehicles. The system includes processing circuitry and a memory configured to capture a set of wireless data traffic from a wireless transmission and perform frequency spectrum analysis on datagram arrival times to classify the set of wireless data traffic based upon potential constant-datagram-rate data content that is indicative that at least a portion of the set of wireless data traffic is emanating from an unmanned aerial vehicle.

In some embodiments, the processing circuitry is further configured to capture the set of wireless data traffic from a Wi-Fi receiver. In some embodiments, the processing circuitry is further configured to periodically switch the Wi-Fi receiver between different radio-frequency channels. In some embodiments, the processing circuitry is further configured to use multiple Wi-Fi receivers to capture the wireless data traffic with each one of the multiple Wi-Fi receivers tuned to a different radio-frequency channel. In some embodiments, the processing circuitry is further configured to use detected peak frequencies to determine if any constant-datagram-rate traffic within the set of wireless data traffic potentially contains video traffic streaming from an unmanned aerial vehicle. In some embodiments, the processing circuitry is further configured to use detected peak frequencies to determine if any constant-datagram-rate traffic within the set of wireless data traffic potentially contains streaming command, control, and position update messages sent to or from an unmanned aerial vehicle. In some embodiments, the processing circuitry is further configured to use the direction of propagation of the wireless transmission to classify the set of wireless data traffic based on potential emanation from an unmanned aerial vehicle. In some embodiments, the system further comprises at least one of a directional antenna and a phased array of antennas configured to determine the direction of propagation of the wireless transmission.

Other embodiments are directed toward a non-transitory computer-readable medium storing instructions that when executed by a computer cause the computer to capture a set of wireless data traffic from a wireless transmission and perform frequency spectrum analysis on datagram arrival times to classify the set of wireless data traffic based upon potential constant-datagram-rate data content that is indicative that at least a portion of the set of wireless data traffic is emanating from an unmanned aerial vehicle.

DETAILED DESCRIPTION OF THE INVENTION

The present invention uses Fourier analysis of network data traffic to identify constant-rate-datagram traffic such as UAV or VoIP data traffic. Fourier analysis uses a mathematical transform called a Fourier transform in order to evaluate the frequency content of a periodic time-domain function. In particular, a Discrete Fourier Transform (DFT) transforms a sequence of samples of a time-domain function into a sequence of samples in the frequency domain. The Fourier transform of any periodic function will contain peaks at any frequencies present in the function.

The data traffic for analysis may be collected from one or more network links connected in-line on the network. The data traffic may also be captured by using a radio-frequency receiver to capture network data traffic from a wireless network. The time-domain data for the Fourier analysis is then obtained by counting the number of datagrams in a data stream that arrive within the time span represented by each time-domain sample. A datagram is a basic transfer unit, such as a packet, associated with a network data transmission. In order to perform the discrete Fourier transform, the present invention preferably uses a Fast Fourier Transform (FFT) algorithm. Once the Fourier transform has been computed, the results can be scanned for any peaks in order to determine the frequency content of the time-domain data. Any source sending datagrams at a near-constant rate will result in a peak in the frequency-domain data at the frequency equal to the rate at which that source is sending datagrams.

One advantage of using Fourier analysis is that the frequency content displayed by the Fourier transform clearly shows the tell-tale constant-datagram-rate typical of UAV or VoIP traffic. The present inventors have found that these peaks will usually still be present even in the presence of significant network jitter or other anomalies that might lead to false negatives. The present inventors have also found that streaming video protocols with near-constant frame rates, that may be indicative of phones or drones, will also produce peaks, though these will be at different frequencies and with different datagram sizes, allowing them to be easily distinguished from audio based traffic.

Figure 1:
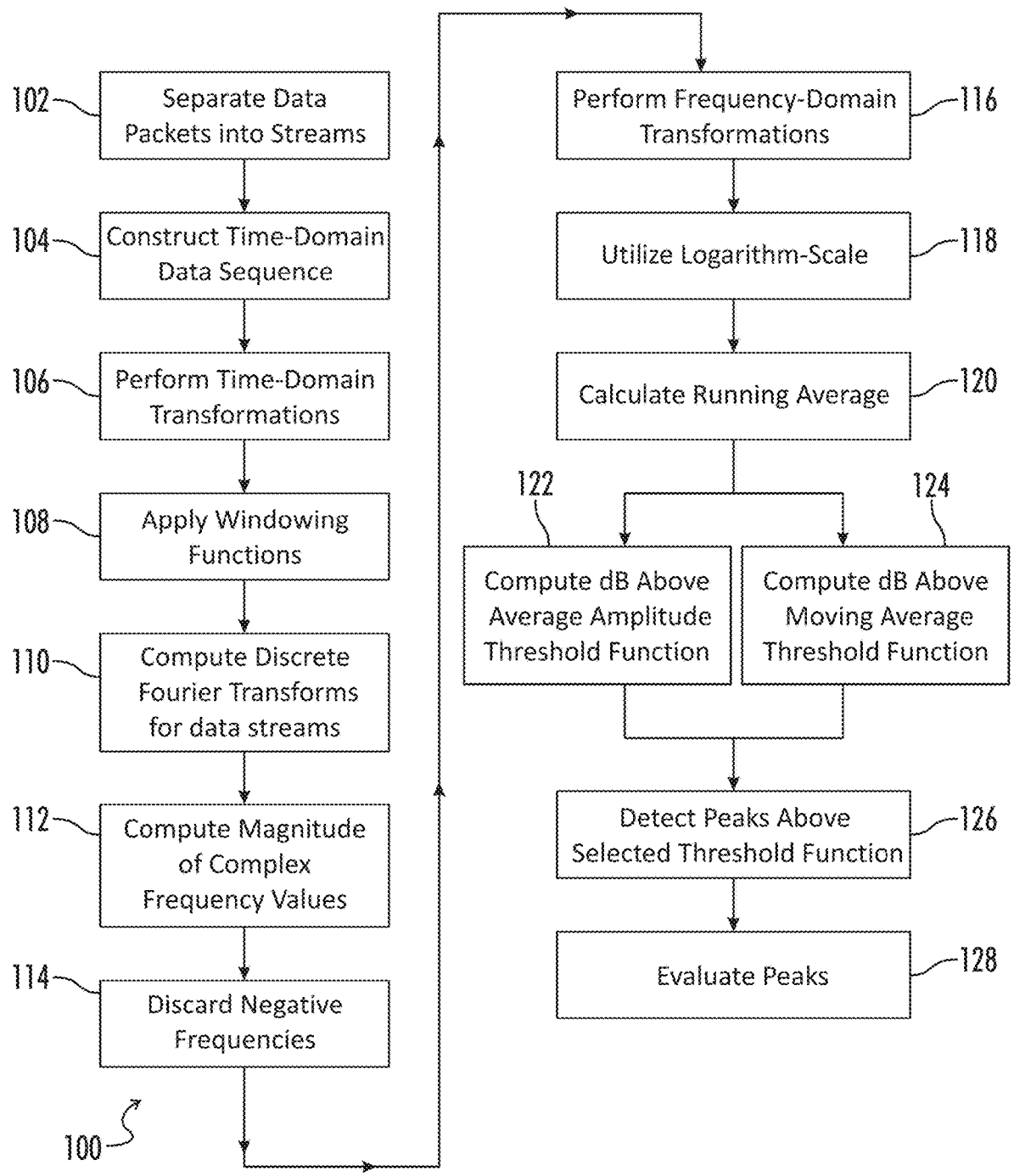
FIG. 1 is a flow chart of a method of classifying a set of network data traffic as containing constant-datagram-rate data in accordance with an embodiment of the present invention.

Referring now to FIG. 1, a flow chart of a method of classifying a set of network data traffic as containing constant-datagram-rate data in accordance with an embodiment of the present invention is shown. The first step in the classification is to separate the captured datagrams, such as packets, into individual data streams as shown in step 102. Each identified stream is preferably defined as consisting of datagrams with equal values for the source IP address, source port number, destination IP address, destination port number, and transport-layer protocol. Datagrams that do not use TCP or UDP protocols are preferably divided into streams based on the source IP address and destination IF address. In the discussed embodiment, non-IP packets or packets whose IP headers are encrypted are preferably separated into streams based on media access control-layer parameters, such as source MAC address and destination MAC address. While the above discussed stream definitions are preferred, alternative definitions can be used in different situations.

One advantageous property of the present invention is that, while separating into streams in the above-described traditional manner will usually be the most useful methodology and produce the clearest results, it is not necessary for the method to work. Since peaks at the frequency of the UAV, VoIP or other constant-rate datagrams will still be present as long as those datagrams are included in the time-domain data, the presence of the constant-datagram-rate streams can still be determined even when the time-domain data also contains datagrams from other streams. Testing by the present inventors has shown that the peaks at the frequencies of the UAV and VoIP streams are still clearly visible in most cases even when all of the datagrams sent or received on the capture interface are being placed into the time-domain data.

The next step in the preferred method, step 104, is to construct the time-domain data sequence that will be input into the FFT algorithm. The time period to be considered is divided up into N equal time spans. N is known as the FFT size and, due to the design of the FFT algorithm, must be a power of 2. As explained in more detail below, the values chosen for N and the duration of each sample are important. Each value in the time-domain sequence will represent one of these N time spans and will consist of the number of datagrams in the selected stream that were received within that time span. In order to improve results, datagrams that are known not to be UAV, video and/or VoIP traffic may be excluded when constructing the time-domain data. In the embodiment discussed, datagrams with payloads of over 500 bytes are not counted, since, according to experimental findings, VoIP datagrams are almost always much smaller than this. This reduces noise in the data by removing unimportant datagrams from file transfers, HTTP requests, and other such traffic. Furthermore, the entire stream for a given DFT time window may be discarded if the number of datagrams received in that stream within that time window represents less than 2 datagrams per second, since VoIP systems must generate datagrams faster than that rate in order to keep audio latency to a minimum. In experiments, the slowest datagram rates found for VoIP were still greater than 10 datagrams per second.

As the classification method progresses through time in a given network data traffic capture, the FFT is applied more often than the duration required to collect enough time-domain information to compute an FFT. This is accomplished by applying a 'sliding window' function to the captured network data traffic. For example, to compute the FFT ten times as often as if each FFT did not use overlapping data, we would collect N/10 new samples for each FFT and reuse the last 9N/10 samples that were used for the previous FFT. There are a couple of significant advantages to this approach. First, when a user is watching a display of the results, the more frequent FFTs allow the user's graph and the result of the classifier to update more often. In addition to making the system seem more responsive, this allows the user to detect a new constant datagram rate stream more quickly when it first appears. Second, collecting the FFT more often helps the running average discussed below to converge to the average values more quickly, increasing the signal-to-noise ratio and, thus, the accuracy of the classifier.

Once the time-domain sequence data set has been constructed, the method proceeds to step 106 where time-domain transformations are performed. In particular, as is usually the case when computing discrete Fourier transforms (DFT's) it is desirable to apply a windowing function to the time domain data as shown in step 108. The presence of frequencies that are not integer multiples of the frequency represented by the first bin, the sampling rate divided by the DFT size, causes a non-integer number of periods of those signals to be present in the time-domain data. While a full discussion of the mathematics behind this effect is beyond the scope of this application, this situation where the first and last values in the time domain do not smoothly approach the same value causes these frequencies to be 'spread' between multiple bins in the DFT instead of being represented by a peak in a single bin. Windowing functions solve this problem by gradually reducing the values of the time-domain samples down to zero at each edge of the time-domain window while leaving them at full amplitude near the center of the time-domain window. Forcing the values to smoothly approach zero on both ends of the time-domain data helps to reduce this 'spreading' effect, but at the cost of widening the peaks, which lessens the ability to distinguish between two adjacent peaks. Several different window shapes which lead to different effects in the frequency domain are frequently used in digital signal processing (DSP) depending on the particular needs of the application.

Once the windowing functions are performed on the time domain data, the method proceeds to step 110 wherein Discrete Fourier Transforms are computed for the data streams. Once all desired time-domain transformations have been applied, the discrete Fourier transform is performed on the time-domain data in order to convert it into frequency-domain data. As mentioned above, the Fast Fourier Transform algorithm is preferably used to compute the DFT.

Once the DFT has been computed, some additional math is necessary to get the desired frequency-domain data. First, the results of a DFT are complex numbers. In order to get the magnitude of the frequency content for each resulting frequency bin, the magnitude of these complex vector values must be computed. This is done by computing the typical Euclidean 2-D vector magnitude for the complex value in each frequency bin as shown in step 112. In order to improve data visualization for a human user, it is also helpful to raise each magnitude to the fourth power to emphasize the peaks. However, since this does not actually increase the signal-to-noise ratio, it is omitted from an automated system as it provides no benefit to the automated classifier.

When viewed in the frequency domain, the output of a DFT includes a mirror image of the frequency data. In particular, the actual zero frequency value is in the middle of the data and all values to its right are mirrored around it to create a 'negative' frequency image. Since this data is an exact mirror of the positive frequency information, it provides no useful information in the frequency domain and can be discarded as shown in step 114.

Once the FFT results have been computed, additional transformations may be applied to the frequency-domain data as shown in step 116. The discussed embodiment performs two preferred computations on the frequency-domain information. In step 118, the $\log_{10}$ of each data point is computed. DFT results typically have values that vary by many orders of magnitude, so it is usually most useful to evaluate results on a logarithmic scale. In particular, the use of a decibel (dB) scale is preferred.

Frequency-domain data computed from time-domain information in real-world applications almost always contains significant amounts of random noise. In the present instance, this noise primarily results from jitter in datagram arrival times, extraneous datagrams that may have been counted, such as signaling datagrams, as well as mathematical artifacts of the DFT. Since this noise is random in nature, its level within each frequency bin will vary dramatically from one FFT computation to the next. Peaks that represent a real signal, on the other hand, will have only very minor variation from one FFT computation to the next. As a result of these properties, keeping a running average of the last several FFTs, shown in step 120, averages out the random variation in the noise. This effect greatly increases the signal-to-noise ratio, which in turn improves the accuracy of the classifier. Specifically, variation in the random noise is inversely proportional to the square root of the number of traces averaged. So, for instance, a 64-trace running average reduces random variation in noise amplitude by a factor of 8.

Once the running average has been calculated in step 120, the method proceeds to at least one of steps 122 and 124 wherein a threshold function is computed that is then used to detect peaks in the data. In one embodiment, steps 122 and 124 are options for implementing step 126. Alternatively, an embodiment may include both of steps 122 and 124 as separate steps which are each performed. One possible threshold function that can be computed to detect peaks is a dB above average amplitude function as shown in step 122. In accordance with such a threshold function, a given dB level above the average magnitude of the running-average trace is specified and any peaks that exceed this threshold are recorded. However, this threshold function performs poorly when some parts of the frequency spectrum have higher average noise levels than others. It can lead to both missed peaks in portions of the spectrum with lower average noise levels and false peak detections in portions of the spectrum with higher average noise values.

As a result of the drawbacks in the usage of the average amplitude, the preferred threshold function is implemented by computing a moving average over a given number of frequency-domain bins as shown in step 124. A given dB level above that moving average is then specified as the peak detection threshold. A slight modification on this function may be implemented wherein the fourth roots of the values within the moving average window are summed, divided by the number of points, and then the result raised back to the fourth power. This modification prevents the moving average itself from rising too much in the vicinity of peaks, which could result in a peak being missed. Both the root and width of the moving average window are tunable parameters in this function that can be selected by a user of the present invention.

The method then proceeds to step 126 wherein the threshold function selected in step 122 or 124 is used to detect peaks above the selected threshold function in the resulting frequency-domain data. Specifically, the frequency bin with the highest magnitude within any set of adjacent bins that have magnitudes above the level of the threshold function will be recorded as a peak.

The final step in the classification method is to evaluate the set of peaks detected by the threshold functions in order to classify the stream as containing UAV, video and/or VoIP data traffic or not. As a straightforward method, a range of frequencies can be chosen to classify as UAV, video and/or VoIP when peaks are present in that range. The present inventors have determined experimentally that VoIP traffic frequencies generally lie between 10 Hz and 100 Hz, so the discussed embodiment of the classifier preferably uses this range. However, as discussed herein, alternative methods of evaluating the detected peaks can be used depending upon the application.

Figure 2:
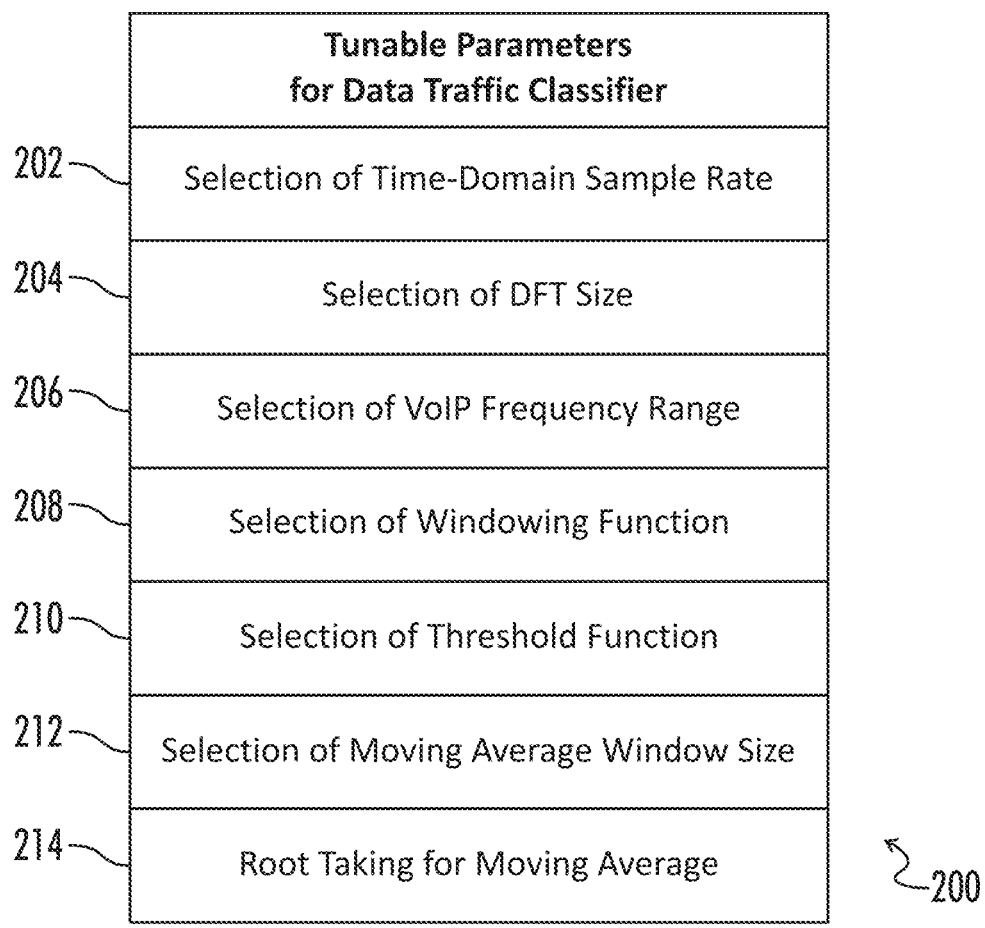
FIG. 2 is a table of tunable parameters for a classification system constructed in accordance with an embodiment of the present invention.

The present methods and apparatus for classifying signals include several tunable parameters. Referring now to FIG. 2 a list of tunable parameters 200 for the present classifying system and apparatus is shown. One of the first parameters that must be selected in any Fourier analysis system is the sample rate 202 to be used when collecting the time-domain data. The maximum frequency that can be detected by a system using a given sample rate is half of the sample rate, commonly referred to as the Nyquist frequency. As discussed herein, VoIP frequencies can be up to about 100 Hz, so at least 200 Hz sampling rate is needed in order to accurately detect VoIP traffic. However, in other applications such as detecting UAV and/or drone data traffic, different sampling rates may be appropriate. A tradeoff is involved as higher sample rates result in less frequency resolution for a given FFT size. That is, the frequency range represented by each data point will be wider, resulting in less accurate frequency information about a given peak. The present inventors have found that sample rates of 200 Hz-1,000 Hz, e.g. time-domain sample lengths of 5 ms-1 ms, respectively, yield the best detection results for VoIP. A value near the middle of that range, 500 Hz (a sample length of 2 ms), is preferred.

The DFT size 204, the number of samples that will be used as input to each DFT, is the next most important parameter to be selected in any Fourier analysis system. For a given sample rate, the DFT size will determine the available frequency resolution. It is also important to remember that, in order to use an FFT algorithm to compute the DFT, the DFT size must be a power of 2. As mentioned above, only half of the output values are meaningful. Since the highest frequency that can be detected is half of the sample rate, this means that the frequency resolution, the width of the frequency range represented by each output value, is equal to the sample rate divided by the size of the DFT. Using the preferred selection of 500 Hz for the sample rate, this means that a 128 point DFT would have frequency bin sizes of 3.9 Hz while a 512 point DFT would have frequency bin sizes of about 1 Hz and a 2,048 point DFT would have frequency bin sizes of about 0.25 Hz. A 2,048 point DFT is preferred for the classifier, as experimentation has shown 0.25 Hz resolution to work well for resolving the peaks produced by VoIP traffic while also being reasonable in regards to memory and processor usage. For other applications, different DFT sizes may be appropriate.

Another important tunable parameter is the range of frequencies 206 that are classified as a specific type of signal such as UAV or VoIP data traffic. Since the present inventors' experimentation has revealed that almost all VoIP systems have datagram frequencies between 10 Hz and 100 Hz, this is the preferred range for a VoIP classifier.

As mentioned above, there are many different DFT windowing functions in use for various digital signal processing applications. While selecting a windowing function 208 is generally necessary in order to prevent spreading in the frequency domain known as spectral leakage from arising, which window is most appropriate for a given application depends on which information from the DFT is most important for that application. Each windowing function has different properties regarding spectral leakage and distortion of the magnitude and width of peaks. Since the present application is concerned primarily with the ability to resolve the frequency of peaks, the Hamming window was chosen for the windowing function, since it results in relatively minimal horizontal spread of peaks while still providing significant suppression of spectral leakage.

The function used as the threshold for detecting peaks is another important selectable parameter framework. When selecting a threshold function 210, it is important that the selected threshold function tracks the noise floor of the frequency domain data and remains slightly above the highest values of the random noise. Staying above the highest random noise values is important in order to prevent false positives in the peak detection. On the other hand, remaining as low as possible to still avoid the noise is needed in order to avoid missing peaks that might occur in portions of the spectrum where the average noise values are lower. Furthermore, it is important that the threshold function rises and falls with the average noise values across the spectrum, but that it does not rise for actual peaks, since a threshold function that rises in the vicinity of peaks could cause those peaks to remain below the threshold and evade detection. In addition, changes in the peaks height may be indicative of changes is the sources position or transmitting parameters.

Figure 3:
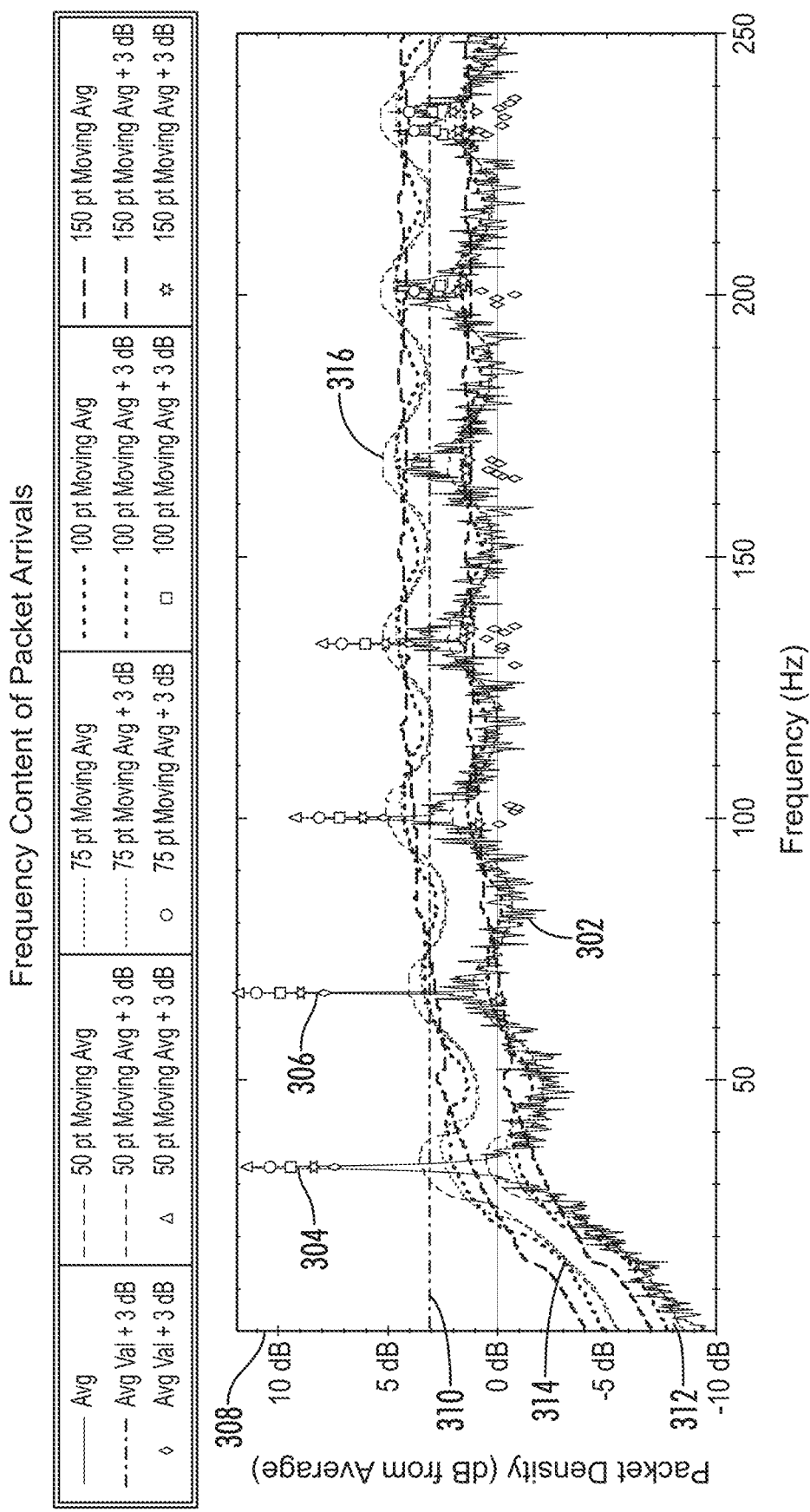
FIG. 3 is a graph of a Fast Fourier Transform of VOIP traffic showing the use of thresholds in accordance with an embodiment of the present invention.

As mentioned above, the discussed embodiment could use a constant dB level above the average value of the spectrum, but preferably uses a constant dB level above a moving or running average that attempts to track the noise floor as threshold functions. Both of these options can be seen in FIG. 3 where they have been applied to a trace generated from exemplary VoIP traffic such as a Skype call. The frequency trace shows the average trace 302 with peaks at the VoIP datagram frequency 304 and its harmonics 306. The vertical axis 308 units have been set up as decibels with a reference level equal to the average of the frequency domain values. Furthermore, markers have been added at all frequencies where each threshold function detected a peak. The horizontal line 310 demonstrates the first threshold function option, a constant 3 dB above the average value over the spectrum. While it can be seen that this function correctly captures the true peaks, several spurious peaks where the random noise crosses this threshold can also be seen. The lines 312 represent the 50-point, 75-point, 100-point, and 150-point moving averages, respectively. For each of these, a threshold 314 equal to these moving averages plus 3 dB has also been drawn. It can be seen in the graph that, by adjusting to the local noise floor, these functions do not produce the false positives produced by using the constant-value threshold function, though they still capture the valid peaks. In FIG. 3, four different options for the moving average window size and the thresholds generated by each of these can also be seen. While it can be seen that all four thresholds correctly capture the first four peaks and none of them produce any false positives, it can also be seen that the 50-point moving average 316 rises significantly in the vicinity of each peak and this causes it to fail to detect the last three peaks. The 75-point and 100-point moving averages, on the other hand, rise much less in the vicinity of peaks and correctly capture all 7 peaks while still producing no false positives. The 150-point moving average also correctly captures each peak, but it can be seen in several different portions of the graph that the 150-point trace does not sufficiently track the local noise floor. While this did not end up resulting in any false negatives or false positives in this particular example, it certainly could in some situations. In light of these results, the 100-point moving average plus 3 dB is preferred as the threshold function for the classifier, since it does the best job of staying above the random noise while not rising dramatically in the vicinity of peaks.

Figure 4:
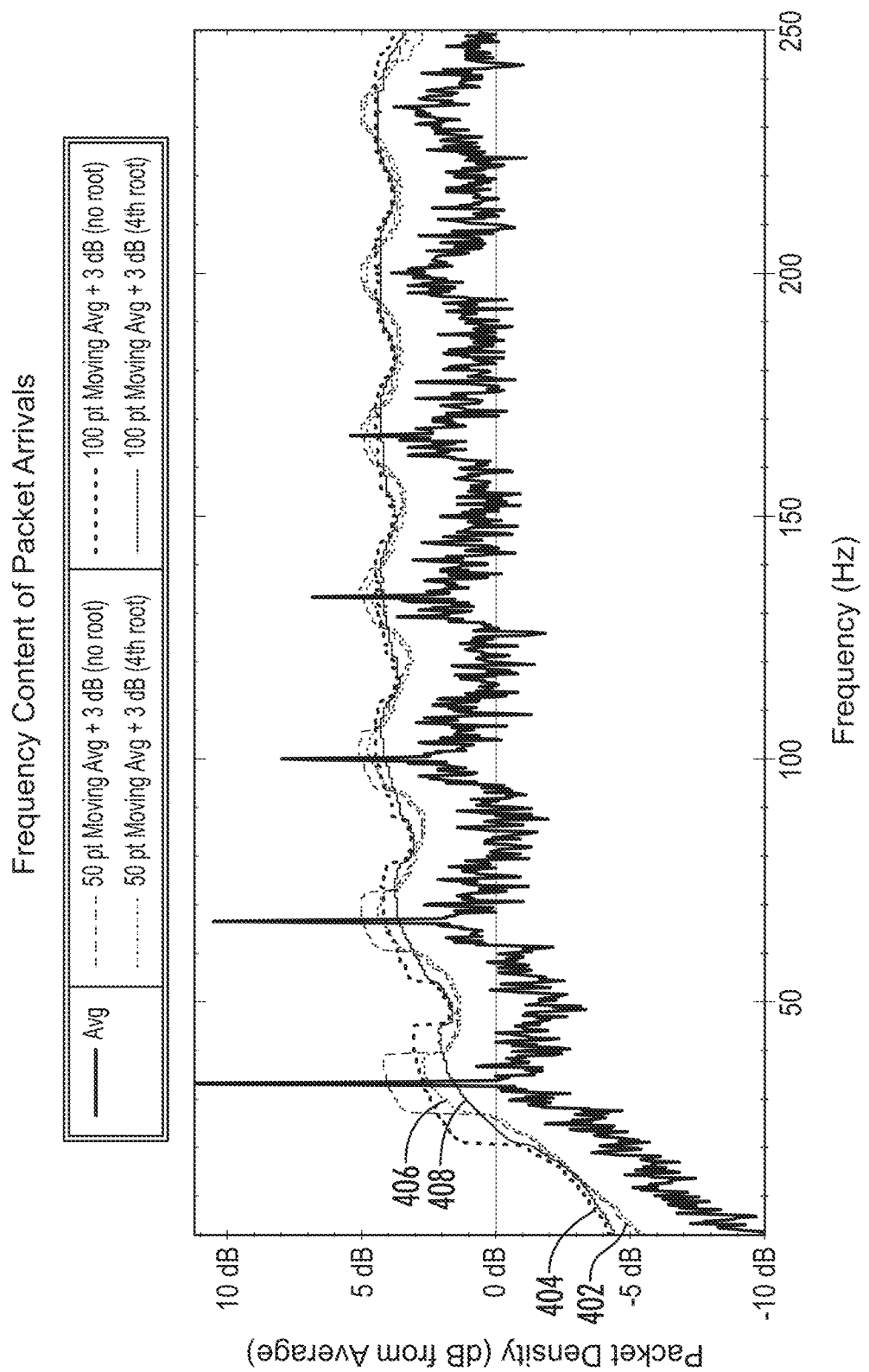
FIG. 4 is a graph of a Fast Fourier Transform of VOIP traffic showing the use of no-root and $4^{th}$-root moving average thresholds in accordance with an embodiment of the present invention.

FIG. 4 shows the 50-point 402 and 100-point 404 +3 dB threshold functions both with and without taking the fourth root of the values before averaging. As can be seen, both the 50-point and 100-point moving averages rise dramatically in the vicinity of peaks when the root is not taken. Taking the fourth roots as shown in lines 406 and 408, however, suppresses most of this undesirable rise. For each of the thresholds, using a square root would produce a line between the no-root line and the fourth-root line. For the preferred classifier, the fourth root is used in order to keep rises in the vicinity of peaks to a minimum.

There are several advantages to embodiments of the present constant-rate datagram detection method using Fourier analysis. The primary advantage is that the frequency of relevant datagrams will still be present in the results of the Discrete Fourier Transform even if the stream contains other datagrams. This frequency component will be unaltered by other "noise" datagrams in the stream, unlike the average datagram inter-arrival time or variance of datagram inter-arrival time, which could be dramatically altered by the presence of "noise" datagrams. This allows the present invention to detect UAV, VoIP, video and/or other constant-datagram-rate streams that other methods would likely miss. Additionally, if multiple constant rate datagram streams are present in the data being transformed, the datagram frequency of each of those streams will appear in the FFT graph. Furthermore, multiple streams can be fed into the FFT at the same time, allowing detection of more complicated schemes where parts of the constant rate datagram stream are sent on different ports in an attempt to evade detection. These advantages make using the FFT significantly more robust in terms of the types of constant-datagram-rate streams that it is capable of detecting.

In addition to being more robust, using Fourier analysis for constant-datagram-rate detection also has other advantages. It does not require extensive training data sets to be generated or pre-classified nor does it require the user to classify clusters. These are large advantages of the statistical and Fourier analysis methods, as generating sufficient training data to be representative of all of the types of network traffic that the system could encounter is extremely difficult. Another advantage of the Fourier analysis is that, while most people are not familiar with its mathematical foundation, most users of, for example, a VoIP detection system are already familiar with seeing amplitude vs. frequency graphs from the spectrum analyzers on audio equipment or electromagnetic spectrum analyzers used for electrical engineering and signal discovery/analysis applications. Also, since displaying amplitude vs. frequency data is a common need in electronic test equipment, there are well-established user interface designs for displaying such data that already exist. These user interfaces include the concept of spectrograms, which use the y-axis to display multiple spectral traces over time and use the pixel color to indicate amplitude. Another user interface advantage with Fourier analysis is that, unlike some machine learning methods or even some heuristics, it should be obvious to the user by looking at the graph why the system is classifying a stream as a particular type of constant-datagram-rate signal.

Figure 5:
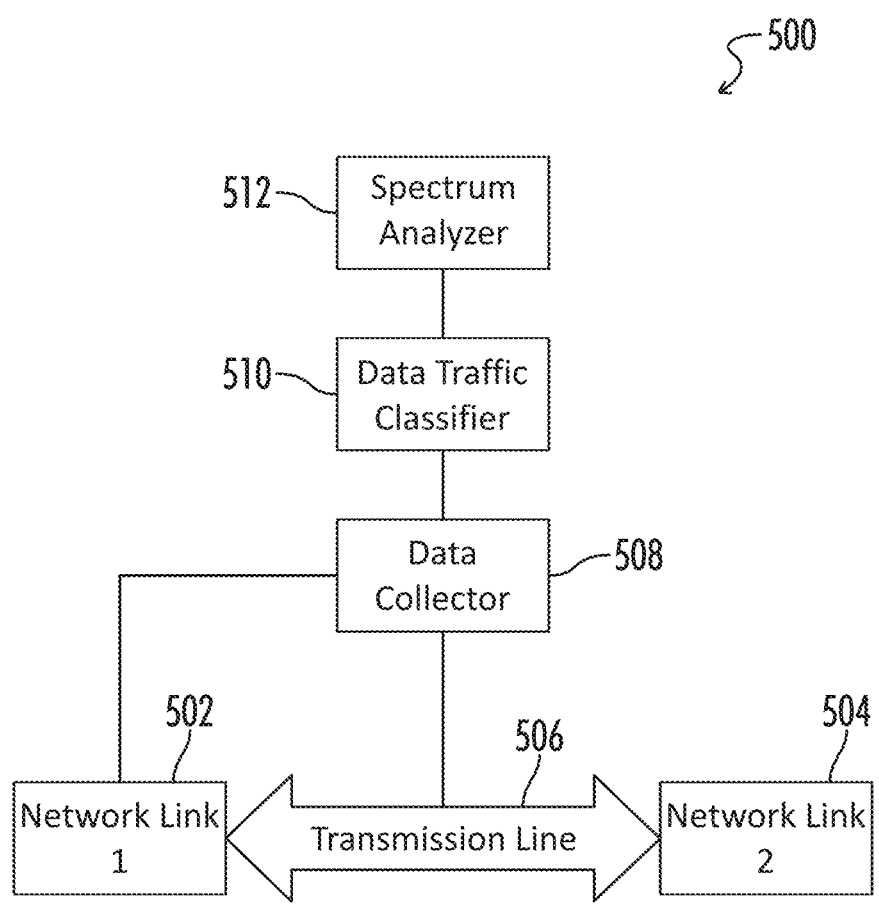
FIG. 5 is a diagram of a system for detecting constant-datagram-rate network traffic inline in accordance with an embodiment.

As discussed herein, the disclosed methods and systems may be applied to data traffic directly collected from a wired network link or wireless network traffic received by a radio-frequency receiver. Referring now to FIG. 5, a diagram of a system 500 for detecting constant-datagram-rate network traffic inline in accordance with an embodiment is shown. The system 500 uses a data collector 508 to collect network data traffic that is being transmitted between two network elements or links 502 and 504 along a transmission line 506. The data collector 508 may collect the network data traffic directly from a network link 502 or 504 or directly from the transmission line 506. The data collector then provides the collected network data traffic to a data traffic classifier 510 which may sort the network traffic data prior to frequency analysis according to datagram size, source IP address, destination IP address, source port number, destination port number, or transport-layer protocol to limit the scope of the frequency analysis. The data traffic classifier 510 then provides the presorted network data traffic to the spectrum analyzer 512 for analysis to detect any constant-datagram-rate network traffic as described herein.

Figure 6:
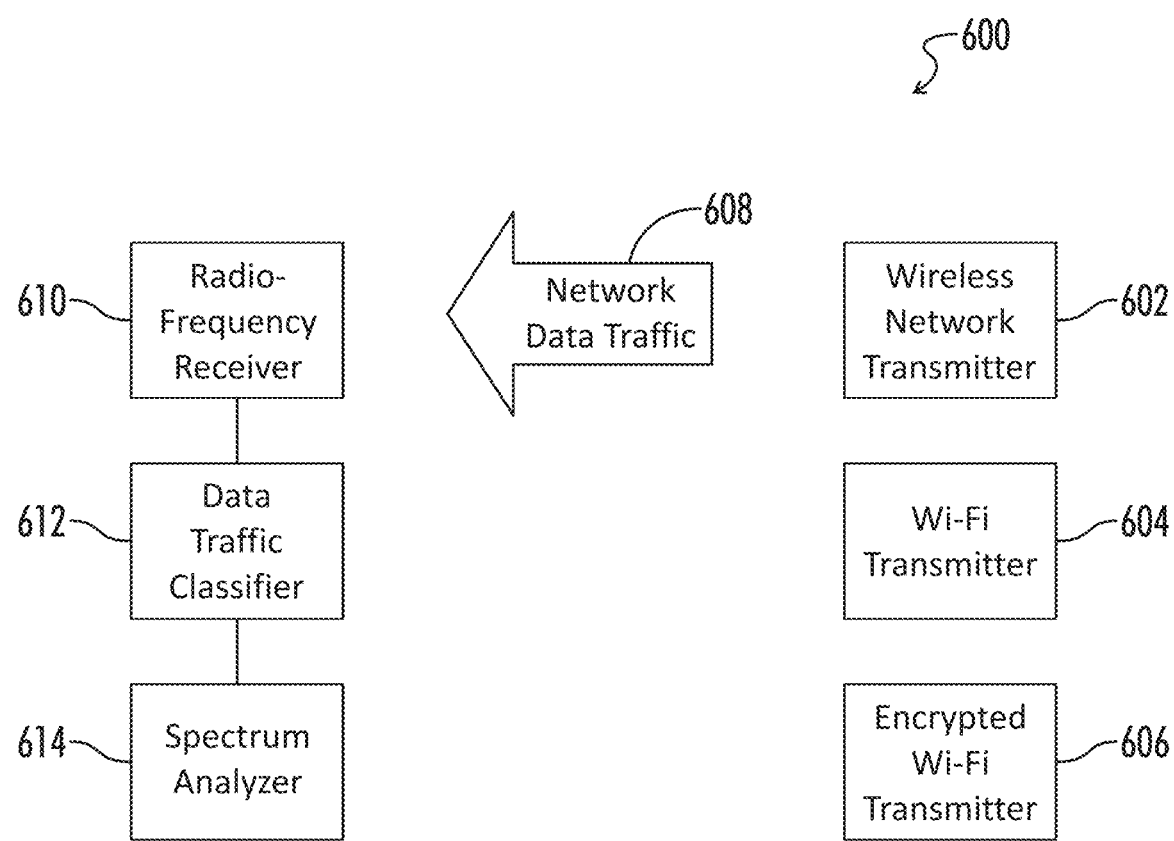
FIG. 6 is a diagram of a system for detecting constant-datagram-rate network traffic transmitted by wireless networks in accordance with an embodiment.

Referring now to FIG. 6, a diagram of a system for detecting constant-datagram-rate network traffic transmitted by wireless networks in accordance with an embodiment is shown. The system 600 of FIG. 6 uses a wireless radio-frequency receiver 610 as a data collector to collect wireless network data traffic 608 that is being transmitted by wireless data traffic sources 602, 604 and 606. The wireless data traffic source may be any type of wireless network transmitter 602. In an embodiment, a Wi-Fi transmitter 604 may be transmitting the wireless network data traffic 608. When monitoring networks where IP addresses and port numbers cannot be obtained, such as when passively monitoring an encrypted Wi-Fi network 606, media access control-layer parameters, such as MAC addresses, may be used by a data traffic classifier 612 to presort the network data traffic 608 received by the wireless radio-frequency receiver 610. For example, when source and destination IP addresses are not available, source and destination MAC addresses may be used to sort captured datagrams into streams. When available, the data traffic classifier 612 may also sort the network traffic data prior to frequency analysis by the spectrum analyzer 614 according to datagram size, source IP address, destination IP address, source port number, destination port number, or transport-layer protocol as discussed herein.

Figure 7:
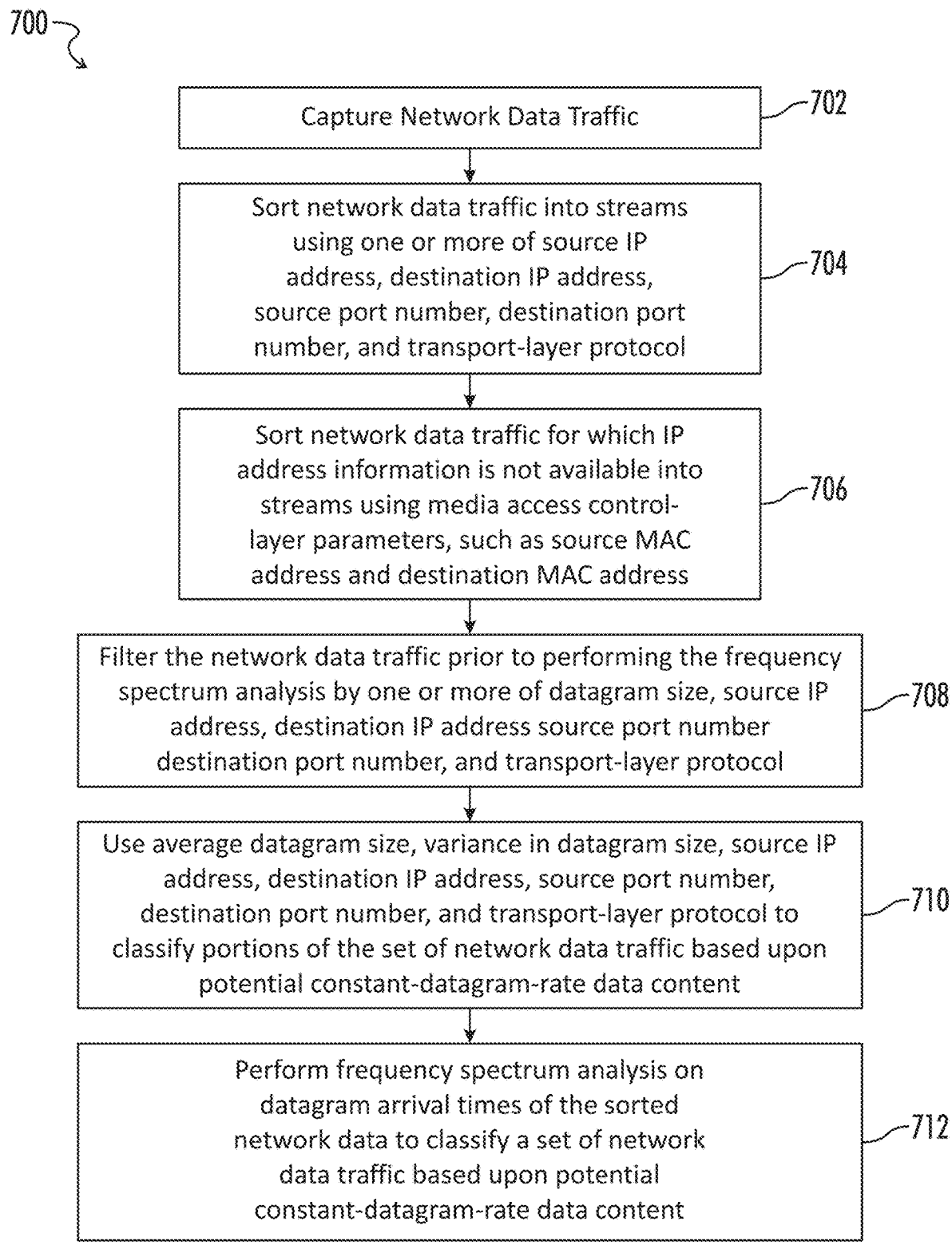
FIG. 7 is a flowchart of a method of determining if network data traffic contains constant-datagram-rate traffic in accordance with an embodiment.

As discussed herein, the network data traffic may be presorted prior to performing the frequency spectrum analysis. Referring now to FIG. 7, an exemplary embodiment of a method 700 for determining if network data traffic contains constant-datagram-rate traffic is shown. In accordance with the embodiment, network data traffic is captured in step 702. The set of network data traffic may be captured directly from a transmission line or network link or wirelessly from a wireless network transmission such as produced by a Wi-Fi transmitter with a Wi-Fi receiver such as described above with respect to FIGS. 5 and 6. In step 704, the captured network data traffic is sorted into streams using one or more of source IP address, destination IP address, source port number, destination port number, and transport-layer protocol. The method then proceeds to step 706 wherein network data traffic for which IP address information is not available is sorted into streams using media access control-layer parameters, such as source MAC address and destination MAC address. The method then proceeds to step 708 wherein, prior to performing the frequency spectrum analysis, the network data traffic is filtered by one or more of datagram size, source IP address, destination IP address, source port number, destination port number, and transport-layer protocol. The method proceeds from step 708 to step 710 wherein at least one of average datagram size, variance in datagram size, source IP address, destination IP address, source port number, destination port number, and transport-layer protocol is then used to initially classify portions of the set of network data traffic based upon potential constant-datagram-rate data content. In step 712, frequency spectrum analysis is performed on datagram arrival times in the sorted network data traffic to classify a set of network data traffic based upon potential constant-datagram-rate data content. The time-domain input data to the frequency spectrum analysis may be constructed by dividing a period of time during which network data traffic was collected to be analyzed into equal-duration slices and counting a number of datagrams received during each time slice as discussed herein.

In an embodiment, the data in steps 710 and 712 are both inputs to the same data traffic classifier. That is, the classifier would take one or more of the parameters listed in step 710 and the peaks detected in step 712 into account when classifying the set of network data traffic with regard to its likelihood to contain constant-datagram-rate traffic. Exactly how all of the parameters in 710 and 712 are weighted in performing the classification depends upon the desired results of a particular application. For example, a data set containing a strong peak at 50 Hz and also using the UDP ports typically used for RTP VoIP streams would be assigned a very high likelihood of containing VoIP traffic, while one containing a moderate peak at 100 Hz on a port not commonly used by any common VoIP applications might be assigned a moderate likelihood of containing VoIP traffic and one containing a peak <2 Hz, large TCP packet sizes, and a port typically used for HTTP or FTP would be assigned a low likelihood of containing VoIP traffic. Using the FFT-detected frequencies peaks to detect constant-datagram-rate traffic in combination with the additional discussed detection parameters produces a classifier that is more accurate.

Once the frequency spectrum analysis has been performed on the time-domain input data, a threshold function is used to detect peaks in output data of the frequency spectrum analysis as discussed above with respect to FIG. 1. The threshold function can be an average value of frequency-domain data values produced by the frequency spectrum analysis plus a constant offset. Alternatively, the threshold function may be a running average of frequency-domain data values produced by the frequency spectrum analysis plus a constant offset. A root may be taken of each of the frequency-domain data values before computing the running average and then the computed running average raised back to a power of the root that was taken. Detected peak frequencies are used to determine if any constant-datagram-rate traffic within the set of network data traffic is likely or unlikely to be constant-datagram-rate data such as streaming video traffic. In addition, one or more of average packet size, variance in packet size, source IP address, destination IP address, source port number, destination port number, or transport-layer protocol may be used to classify portions of the set of network data traffic with regard to its likelihood to contain streaming video traffic content.

Some embodiments of the present invention improve upon the prior art by capturing a set of network data traffic from a wireless transmission and performing frequency spectrum analysis on the arrival times of the captured datagrams to determine whether captured network data traffic contains constant-datagram-rate traffic transmitted at rates characteristic of wireless transmissions from an unmanned aerial vehicle (UAV).

The described methods and systems have several advantages. One of the primary advantages is that, by capturing the network data traffic rather than merely examining changes in received radio-frequency signal power levels over time, the captured traffic can be sorted into individual streams—that is, the network data traffic sent from a particular sender to a particular recipient—and each stream's datagram frequency content can then be examined separately. Since most commercially-available UAVs transmit in the busy 2.4 GHz or 5.8 GHz portions of the frequency spectrum, the ability to examine each stream separately can dramatically increase the signal-to-noise ratio by eliminating datagrams from all other streams when examining the frequency content of each stream.

Another advantage of some embodiments is the ability to use relatively cheap, readily-available Wi-Fi receivers to capture network data traffic rather than requiring more expensive software-defined radios which may need to be programmed for the particular application.

Optionally, embodiments allow filtering the network data traffic by one or more of datagram size, radio-frequency channel, source IP address, destination IP address, source port number, destination port number, and transport-layer protocol used for the transmission of each datagram.

In some embodiments, a Wi-Fi transceiver is used to capture a set of wireless network data traffic. A time-domain dataset is then constructed by dividing a period of time in which network data traffic was collected to be analyzed into equal-duration slices and counting the number of datagrams received in each time slice. Frequency spectrum analysis is then performed on the time-domain dataset using a Fourier transform in order to analyze the frequency content of the datagram arrival times. A threshold function, such as a running average of frequency-domain data values produced by the frequency spectrum analysis plus a constant offset, is then used to find any frequency peaks that exceed said threshold in the frequency-domain data values. The frequencies of any detected peaks are then examined to determine whether they correspond with frequencies characteristic of UAV wireless network data transmissions.

In some embodiments, media access control (MAC)-layer header data on each datagram is examined to determine the source and destination of each datagram and the datagrams are then sorted into streams of matching source and destination address prior to construction of the time-domain input data for the frequency spectrum analysis. The time-domain data is then constructed and frequency spectrum analysis performed on each stream individually, yielding better signal-to-noise ratio—and, thus, probability of detection—than if all captured traffic were examined together.

In some embodiments, a Fourier transform windowing function is applied to the constructed time-domain data prior to performing the frequency spectrum analysis.

In some embodiments, the wireless network data traffic is captured using one or more directional antennas in order to limit captured wireless network data traffic to data traffic from wireless transmissions emanating from directions of interest for detecting UAVs, for example outside of a building.

In yet other embodiments, the wireless network data traffic is captured using one or more phased arrays of antennas. The phase offsets of the received signals at each antenna for each captured datagram are then used to determine the direction from which the captured wireless transmission emanated.

In other embodiments, the Wi-Fi receiver is periodically switched between different radio-frequency channels in order to monitor multiple Wi-Fi channels for the potential presence of wireless network data traffic emanating from an unmanned aerial vehicle.

In other embodiments, multiple Wi-Fi receivers are used to capture the network data traffic, with each receiver set to receive datagrams from a different Wi-Fi channel. This allows multiple channels to be monitored simultaneously for the potential presence of wireless network data traffic emanating from an unmanned aerial vehicle.

Figure 8:
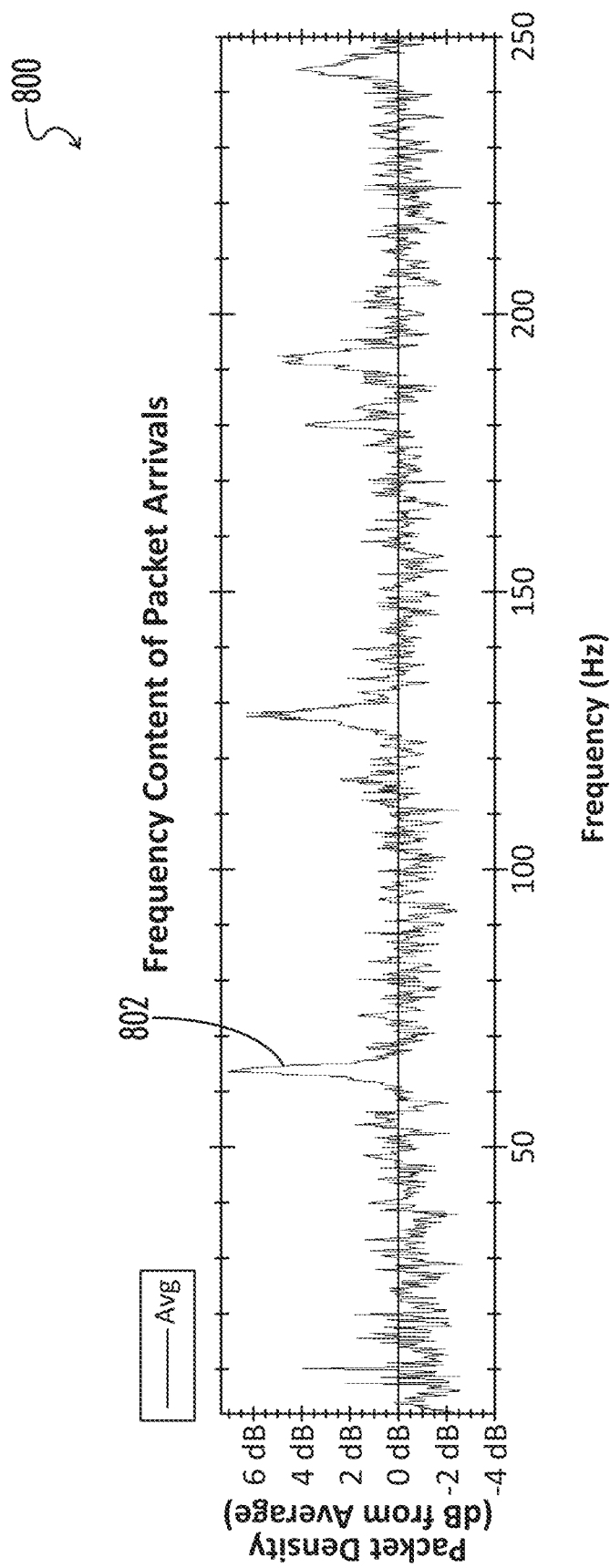
FIG. 8 is a graphical illustration of the frequency-domain results of performing a Fourier transform on the arrival times of a set of datagrams captured from a wireless transmission emanating from an unmanned aerial vehicle in accordance with some embodiments.
Figure 9:
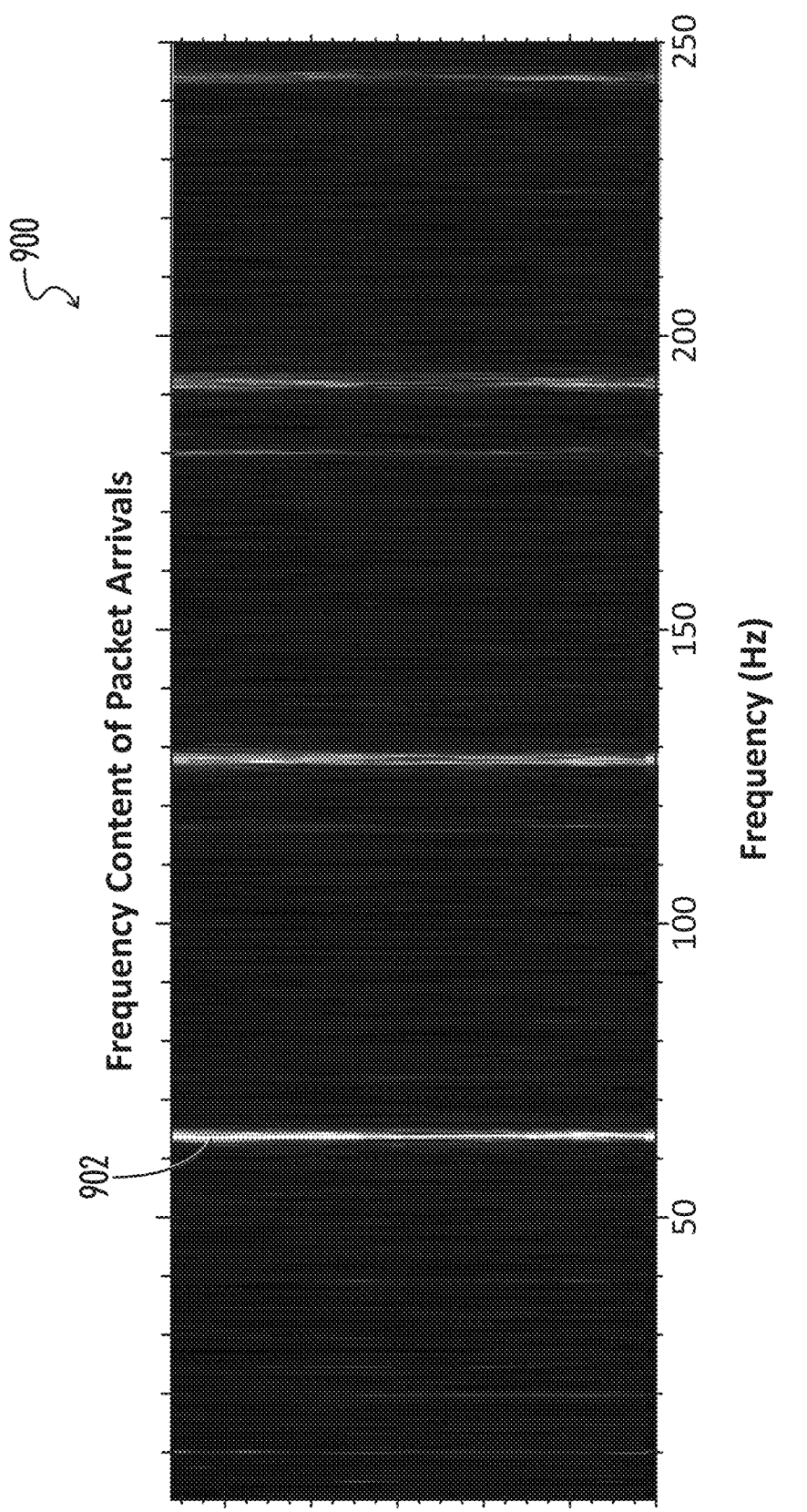
FIG. 9 is a graphical illustration of a spectrogram showing how the frequency-domain results of performing a Fourier transform on the arrival times of a set of datagrams captured from a wireless transmission emanating from an unmanned aerial vehicle in accordance with some embodiments remains relatively constant over time.

FIGS. 8 and 9 illustrate exemplary data from tests of various embodiments performed by the inventors. In particular, FIG. 8 is a graphical illustration of the frequency-domain results of performing a Fourier transform on the arrival times of a set of datagrams captured from a wireless transmission emanating from an unmanned aerial vehicle in accordance with some embodiments and FIG. 9 is an graphical illustration of a spectrogram showing how the frequency-domain results of performing a Fourier transform on the arrival times of a set of datagrams captured from a wireless transmission emanating from an unmanned aerial vehicle in accordance with some embodiments remains relatively constant over time. During the tests, a DJI Mavic Air commercially-available unmanned aerial vehicle was flown approximately 200 feet from a computer with a Wi-Fi network adapter attached to a directional antenna. The Wi-Fi adapter was set to collect any detected Wi-Fi transmissions within a particular Wi-Fi channel. Every 4.096 seconds, the number of datagrams received within each of the 2,048 two-millisecond intervals was counted in order to construct the time-domain input data for the frequency spectrum analysis. A Fast Fourier Transform (FFT) was the performed on the constructed time-domain data and the resulting frequency-domain data graphed. FIG. 8 presents such a graph, with packet density in dB from average displayed on the vertical axis and frequency in Hz displayed on the horizontal axis. The data displayed in FIG. 8 show a strong frequency peak 802 at the 67 Hz frequency point on the horizontal axis at which the UAV was transmitting telemetry and video information back to its controller. Embodiments may associate the known frequency peak, e.g. 67 Hz, with the particular model of UAV, e.g. a DJI Mavic Air, such that future detections of the frequency peak are taken as indications of the presence of the particular model of UAV.

As illustrated in FIG. 9, during the test discussed with respect to FIG. 8, a running spectrogram 900 was also produced, with one horizontal row of pixels generated from the frequency spectrum output of each FFT performed over time. Thus, FIG. 9 illustrates how the detected frequency content varied over time during the test. As can be seen in FIG. 9, as expected, the detected 67 Hz datagram transmission rate 902 was detected consistently throughout the test.

Figure 10:
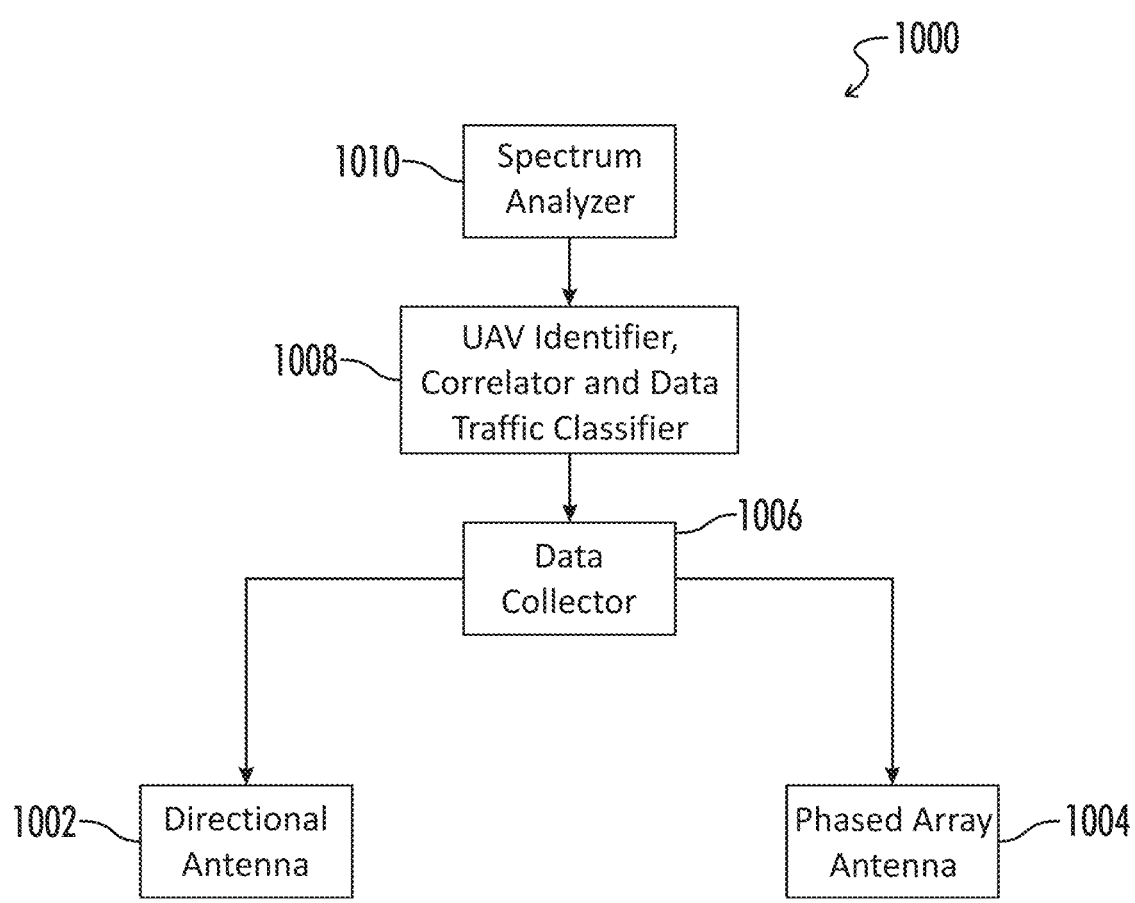
FIG. 10 is a diagram of a system for detecting UAVs and/or UAV data traffic in accordance with some embodiments.

Referring now to FIG. 10, a diagram of a system 1000 for detecting UAV data traffic in accordance with some embodiments is shown. The system 1000 uses a data collector 1006 to collect wireless data traffic that is being received from an antenna such as at least one directional antenna 1002 and/or phased array antenna 1004. For example, one or more Wi-Fi receivers may be used to capture the set of wireless data traffic. A single Wi-Fi receiver may be periodically switched between different radio-frequency channels or multiple Wi-Fi receivers used to capture the wireless data traffic with each one of the multiple Wi-Fi receivers tuned to a different radio-frequency channel.

The data collector 1006 then provides the collected network data traffic to a UAV identifier, correlator and data traffic classifier 1008 which may sort the network traffic data prior to frequency analysis according to datagram size, source IP address, destination IP address, source port number, destination port number, or transport-layer protocol to limit the scope of the frequency analysis. The UAV identifier, correlator and data traffic classifier 1008 then provides the presorted wireless data traffic to a spectrum analyzer 1010 which performs frequency spectrum analysis of the datagram arrival times of the datagrams in the wireless data traffic. The UAV identifier, correlator and data traffic classifier 1008 then uses the frequency spectrum analysis and transmission parameters to identify any constant-datagram-rate data traffic that may be indicative of the presence of a UAV, and/or the likely model of the UAV from which the data traffic is emanating as described herein.

Processing circuitry, including processors and memory, and antennas such as known in the art may be used to implement some or all of the functions of system 1000 including one or more functions of directional antenna 1002, phased array antenna 1004, data collector 1006, UAV identifier, correlator and data traffic classifier 1008, and/or spectrum analyzer 1010. For example, processing circuitry and memory may be configured to capture a set of wireless data traffic from a wireless transmission and perform frequency spectrum analysis on datagram arrival times to classify said set of wireless data traffic based upon potential constant-datagram-rate data content that is indicative that at least a portion of said set of wireless data traffic is emanating from an unmanned aerial vehicle. The processing circuitry may also be configured to capture the set of wireless data traffic from a Wi-Fi receiver, periodically switch the Wi-Fi receiver between different radio-frequency channels, use multiple Wi-Fi receivers to capture said wireless data traffic with each one of the multiple Wi-Fi receivers tuned to a different radio-frequency channel, use detected peak frequencies to determine if any constant-datagram-rate traffic within said set of wireless data traffic potentially contains video traffic streaming from an unmanned aerial vehicle, use detected peak frequencies to determine if any constant-datagram-rate traffic within said set of wireless data traffic potentially contains streaming command, control, and position update messages sent to or from an unmanned aerial vehicle, use the direction of propagation of said wireless transmission to classify said set of wireless data traffic based on potential emanation from an unmanned aerial vehicle, determine the direction of propagation of said wireless transmission, etc. as described herein.

Figure 11:
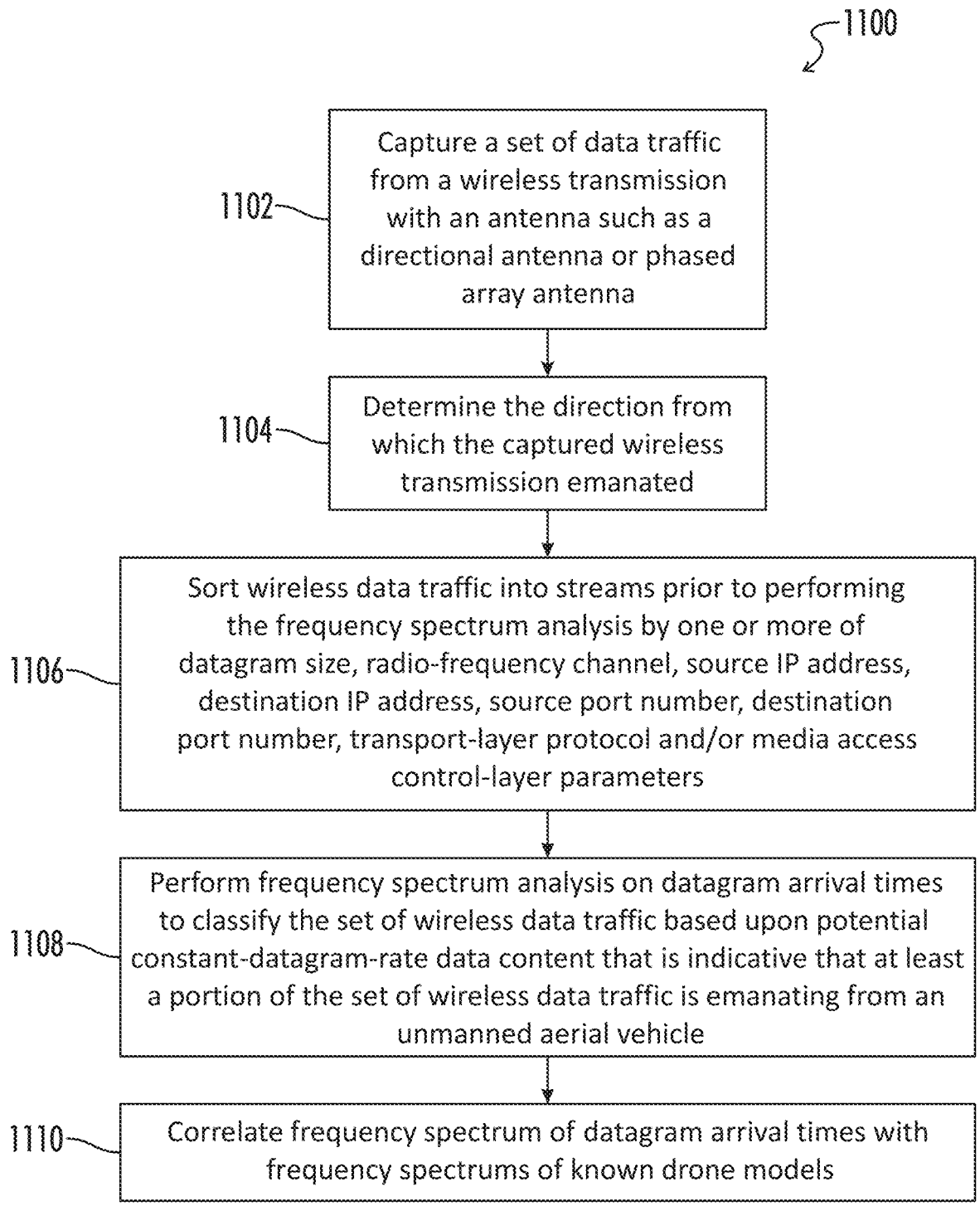
FIG. 11 is a flow chart of a method for detecting UAVs and/or UAV data traffic in accordance with some embodiments.

Referring now to FIG. 11, an exemplary embodiment of a method 1100 for determining if wireless data traffic contains constant-datagram-rate traffic that is indicative of the presence of a UAV is shown. In accordance with the embodiment, a set of data traffic from a wireless transmission is captured with an antenna such as directional antenna or phased array antenna in step 1102. For example, the wireless data may be captured from a Wi-Fi receiver which may be periodically switched between different radio-frequency channels. Alternatively, multiple Wi-Fi receivers may be used to capture the wireless data traffic with each receiver tuned to a different radio-frequency channel.

In optional step 1104, the direction from which the captured wireless transmission emanated is determined. A directional antenna and/or a phased array of antennas may be used to determine the direction of propagation of the wireless transmission. The direction of propagation of the wireless transmission may be used to classify the set of wireless data traffic based on the potential it is emanating from an UAV. For example, the direction from which the data is emanating may be changing or stationary overtime or indicate that the source is airborne or ground based all of which may increase or decrease the probability that the source of the data is a UAV.

As set forth in optional step 1106, the wireless data traffic may be sorted into streams prior to performing the frequency spectrum analysis by one or more of datagram size, radio-frequency channel, source IP address, destination IP address, source port number, destination port number, transport-layer protocol, and/or media access control-layer parameters, such as source MAC address and destination MAC address for data traffic for which IP address information may not be available.

In step 1108, frequency spectrum analysis is performed on datagram arrival times to classify said set of wireless data traffic based upon potential constant-datagram-rate data content that is indicative that at least a portion of said set of wireless data traffic is emanating from an unmanned aerial vehicle. The time-domain input data to the frequency spectrum analysis may be constructed by dividing a period of time during which network data traffic was collected to be analyzed into equal-duration slices and counting a number of datagrams received during each time slice as discussed herein. A threshold function may for example be used to detect peaks in the output data of the frequency spectrum analysis that are indicative of UAV data traffic as described herein. The detected peak frequencies may indicate that at least a portion of the constant-datagram-rate traffic within the set of wireless data traffic potentially contains video traffic streaming from a UAV or streaming command, control, and position update messages sent to or from a UAV.

In optional step 1110, the frequency spectrum of datagram arrival times may be correlated with frequency spectrums of known drone models. For example, a strong frequency peak at the 67 Hz frequency could be correlated with a particular model of UAV as discussed above with respect to FIGS. 7 and 8. In addition, the data transmission parameters set forth in step 1106 may be correlated with the corresponding data transmission parameters of known UAVs to identify the model UAV from which the transmission is originating. Exactly how all of the parameters are weighted in performing the classification and identification may depend upon the desired results of a particular application.

Although there have been described particular embodiments of the present invention of a new System and Method for Detecting Constant-Datagram-Rate Network Traffic Indicative of an Unmanned Aerial Vehicle (UAV), it is not intended that such references be construed as limitations upon the scope of this invention except as set forth in the following claims.

What is claimed is:

1. A method of detecting unmanned aerial vehicles, said method comprising:
  capturing a set of wireless data traffic from a wireless transmission;
  performing frequency spectrum analysis on datagram arrival times to classify said set of wireless data traffic based upon potential constant-datagram-rate data content that is indicative that at least a portion of said set of wireless data traffic is emanating from an unmanned aerial vehicle.

2. The method of claim 1 further comprising capturing said set of wireless data traffic from a Wi-Fi receiver.

3. The method of claim 2 wherein the Wi-Fi receiver is periodically switched between different radio-frequency channels.

4. The method of claim 2 wherein multiple Wi-Fi receivers are used to capture said wireless data traffic with each receiver tuned to a different radio-frequency channel.

5. The method of claim 1 further comprising sorting said set of wireless data traffic based upon a media access control-layer parameter prior to performing the frequency spectrum analysis.

6. The method of claim 1 further comprising using a threshold function to detect peaks in output data of said frequency spectrum analysis.

7. The method of claim 1 further comprising using detected peak frequencies to determine if any constantdatagram-rate traffic within said set of wireless data traffic potentially contains video traffic streaming from an unmanned aerial vehicle.

8. The method of claim 1 further comprising using detected peak frequencies to determine if any constant-datagram-rate traffic within said set of wireless data traffic potentially contains streaming command, control, and position update messages sent to or from an unmanned aerial vehicle.

9. The method of claim 1 further comprising filtering said set of wireless data traffic prior to performing the frequency spectrum analysis by one or more of datagram size, radio-frequency channel, source IP address, destination IP address, source port number, destination port number, and transport-layer protocol.

10. The method of claim 1 further comprising using the direction of propagation of said wireless transmission to classify said set of wireless data traffic based on potential emanation from an unmanned aerial vehicle.

11. The method of claim 10 further comprising using at least one of a directional antenna and a phased array of antennas to determine the direction of propagation of said wireless transmission.

12. A system for detecting unmanned aerial vehicles, said system comprising:
processing circuitry and a memory configured to:
capture a set of wireless data traffic from a wireless transmission; and
perform frequency spectrum analysis on datagram arrival times to classify said set of wireless data traffic based upon potential constant-datagram-rate data content that is indicative that at least a portion of said set of wireless data traffic is emanating from an unmanned aerial vehicle.

13. The system of claim 12 wherein the processing circuitry is further configured to capture said set of wireless data traffic from a Wi-Fi receiver.

14. The system of claim 13 wherein the processing circuitry is further configured to periodically switch the Wi-Fi receiver between different radio-frequency channels.

15. The system of claim 12 wherein the processing circuitry is further configured to use multiple Wi-Fi receivers to capture said wireless data traffic with each one of the multiple Wi-Fi receivers tuned to a different radio-frequency channel.

16. The system of claim 12 wherein the processing circuitry is further configured to use detected peak frequencies to determine if any constant-datagram-rate traffic within said set of wireless data traffic potentially contains video traffic streaming from an unmanned aerial vehicle.

17. The system of claim 12 wherein the processing circuitry is further configured to use detected peak frequencies to determine if any constant-datagram-rate traffic within said set of wireless data traffic potentially contains streaming command, control, and position update messages sent to or from an unmanned aerial vehicle.

18. The system of claim 12 wherein the processing circuitry is further configured to use the direction of propagation of said wireless transmission to classify said set of wireless data traffic based on potential emanation from an unmanned aerial vehicle.

19. The system of claim 12 further comprising at least one of a directional antenna and a phased array of antennas configured to determine the direction of propagation of said wireless transmission.

20. A non-transitory computer-readable medium storing instructions that when executed by a computer cause the computer to:
capture a set of wireless data traffic from a wireless transmission; and
perform frequency spectrum analysis on datagram arrival times to classify said set of wireless data traffic based upon potential constant-datagram-rate data content that is indicative that at least a portion of said set of wireless data traffic is emanating from an unmanned aerial vehicle.

* * * * *